(12) United States Patent
Thiebaud et al.

(10) Patent No.: US 10,846,932 B2
(45) Date of Patent: Nov. 24, 2020

(54) METHOD AND DEVICE FOR COMPOSITING AN IMAGE

(71) Applicant: INTERDIGITAL CE PATENT HOLDINGS, Paris (FR)

(72) Inventors: Sylvain Thiebaud, Noyal sur Vilaine (FR); Julien Fleureau, Rennes (FR); Francois Gerard, Beignon (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 16/093,630

(22) PCT Filed: Apr. 10, 2017

(86) PCT No.: PCT/EP2017/058571
§ 371 (c)(1),
(2) Date: Oct. 13, 2018

(87) PCT Pub. No.: WO2017/182315
PCT Pub. Date: Oct. 26, 2017

(65) Prior Publication Data
US 2019/0122439 A1 Apr. 25, 2019

(30) Foreign Application Priority Data

Apr. 22, 2016 (EP) ..................................... 16305473
Sep. 29, 2016 (EP) ..................................... 16306258

(51) Int. Cl.
*G06T 19/00* (2011.01)
*G06T 15/50* (2011.01)
(Continued)

(52) U.S. Cl.
CPC ............ *G06T 19/006* (2013.01); *A63F 13/26* (2014.09); *G06F 3/011* (2013.01); *G06F 3/1423* (2013.01);
(Continued)

(58) Field of Classification Search
None
See application file for complete search history.

(56) References Cited

U.S. PATENT DOCUMENTS 7,774,044 B2   8/2010   Sauer et al.
7,843,471 B2  11/2010   Doan et al.
(Continued)

FOREIGN PATENT DOCUMENTS

| CN | 101452339    | 4/2013 |
| WO | WO2014108799 | 7/2014 |
| WO | WO2016012044 | 1/2016 |

OTHER PUBLICATIONS

Kawakita et al., "Augmented TV: An Augmented Reality System for TV Programs Beyond the TV Screen", 2014 International Conference on Multimedia Computing and Systems, Marrakech, Morocco, Apr. 14, 2014, pp. 955-960.

(Continued)

*Primary Examiner* — Peter Hoang
(74) *Attorney, Agent, or Firm* — Invention Mine LLC (57) ABSTRACT

A method and device for compositing and/or transmitting a first image to a first display device, the method comprising receiving a second image representative of a scene, the scene comprising a second display device displaying a third image; receiving the third image; obtaining a first information representative of pose of the second display device with respect to the scene; distorting the third image according to the first information; generating the first image by combining the second image and the distorted third image using the obtained first information; and transmitting data representative of the first image.

14 Claims, 6 Drawing Sheets

(51) Int. Cl.
   *A63F 13/26* (2014.01)
   *H04N 13/156* (2018.01)
   *G06F 3/14* (2006.01)
   *G06F 3/01* (2006.01)
(52) U.S. Cl.
   CPC ......... *G06T 15/503* (2013.01); *H04N 13/156* (2018.05); *H04N 2201/3245* (2013.01)

(56) References Cited

U.S. PATENT DOCUMENTS

| | | |
|---|---|---|
| 8,386,918 B2 | 2/2013 | Do et al. |
| 2013/0194437 A1 | 8/2013 | Osman |

OTHER PUBLICATIONS

Lu et al., "Fast and Globally Convergent Pose Estimation from Video Images", IEEE Transactions on Pattern Analysis and Machine Intelligence, vol. 22, No. 6, Jun. 2000, pp. 610-622.

Fanelli et al., "Real Time Head Pose Estimation with Random Regression Forests", 2011 IEEE Conference on Computer Vision and Pattern Recognition, Colorado Springs, Colorado, USA, Jun. 20, 2011, pp. 617-624.

Ababsa et al., "Robust Camera Pose Estimation Using 2D Fiducials Tracking for Real-Time Augmented Reality Systems", 2004 ACM SIGGRAPH International Conference on Virtual Reality Continuum and its Applications in Industry, Singapore, Jun. 16, 2004, pp. 431-435.

Oliveira et al., "Skin Detection using HSV Color Space", Workshops of Brazilian Symposium on Computer Graphics and Image Processing (Sibgrapi 2009), Rio De Janerio, Brazil, Oct. 11, 2009, pp. 1-2.

Simsarian et al., "Windows on the World: An example of Augmented Virtuality", Interfaces 97: Man-Machine Interaction, Montpellier, France, May 1997, pp. 482-490.

Ogi el al., "Communication between Outdoor Field and Immersive Virtual Environment", 20th International Conference on Advanced Information Networking and Applications, Vienna, Austria, Apr. 18, 2006, IEEE, pp. 637-641.

Nahon et al., ""Never Blind VR" Enhancing the Virtual Reality Headset Experience with Augmented Virtuality", 2015 IEEE Virtual Reality (VR), Arles, France, Mar. 23, 2015, pp. 347-348.

METHOD AND DEVICE FOR COMPOSITING AN IMAGE

This application claims the benefit, under 35 U.S.C. § 365 of International Application PCT/EP2017/058571, filed Apr. 10, 2017, which was published in accordance with PCT Article 21(2) on Oct. 26, 2017, in English, and which claims the benefit of European Patent Application No. 16305473.7 filed Apr. 22, 2016 and of European Patent Application No. 16306258.1 filed Sep. 29, 2016.

1. TECHNICAL FIELD

The present disclosure relates to the domain of image processing, for example in the context of immersive video content consumed on a mobile device such as for example a head-mounted display (HMD), a tablet or a Smartphone.

2. BACKGROUND

Display devices such as a head-mounted display (HMD) or a tablet allow a user to browse into an immersive video content. For example, Head-Mounted Displays (HMD) are display devices, worn on the head or as part of a helmet, that have a small display optic in front of one eye (monocular HMD) or in front of each eye (binocular HMD). They especially allow a user to watch a 3D virtual scene and browse it by rotating his/her head. The view of the scene is updated accordingly to the user head pose. Such devices were initially proposed some decades ago, but recently, due to the progress of OLED and LCD screens especially, their prices as well as their performances have been dramatically changed insomuch that some HMDs are now consumer products. The price of such a HMD is reasonable and may offer a 110° field of view while achieving very low latency (e.g. 20 ms) regarding the head pose estimation.

A variety of disparities can affect the overall user experience. For example, if the visual parameters are not aligned, the user may feel nauseous. Therefore, the device and the ability to create an immersion experience may improve or otherwise generate issues with regard to the ability of the user to interact with the real world.

3. SUMMARY

References in the specification to "one embodiment", "an embodiment", "an example embodiment", "a particular embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure relates to a method of transmitting a first image to a first display device, the method comprising:
  receiving a second image representative of a scene, the scene comprising a second display device displaying a third image;
  receiving the third image;
  obtaining a first information representative of pose of the second display device with respect to the scene;
  distorting the third image according to the first information;
  generating the first image by combining the second image and the distorted third image using the obtained first information;
  transmitting data representative of the first image.

According to a characteristic, the distorted third image is overlaid onto a part of the second image comprising a representation of a screen of the second display device.

According to a specific characteristic, the second image is received from a camera associated with the first display device.

According to another characteristic, the third image is received from a source device transmitting the third image to the second display device for displaying on the second display device.

According to a particular characteristic, the first display device is a head-mounted display and the second display device is a mobile device comprising a display screen.

According to another characteristic, the first information is obtained by comparing the received third image with the content of the second image comprising the second display device displaying the third image.

According to a specific characteristic, the obtaining comprises receiving the first information from the second display device.

According to another characteristic, the obtaining comprises:
  acquiring a fourth image of the second display device, at least one fiducial marker being displayed on the second display device;
  tracking the at least one fiducial marker on the fourth image;
  determining the first information based on the tracked at least one fiducial marker.

According to a particular characteristic, the first display device comprises a camera adapted to acquire the fourth image.

According to a specific characteristic, the fourth image is acquired with a camera external to the first display device, the method further comprising obtaining a second information representative of position of the first display device, the first image being composited using the second information.

According to a particular characteristic, the third image belongs to a set of images comprising:
  an image of a video sequence representative of a real environment;
  an image of a video sequence representative of a virtual environment;
  an image of a video sequence representative of a scene comprising real and virtual objects; and
  an image comprising at least one graphical object of a Graphical User Interface;
  an image comprising at least one textual element.

According to a specific characteristic, compositing further comprises combining the second image and distorting third image with a fifth image representative of hands holding said second display device onto which is overlaid said distorted third image.

The present disclosure also relates to a device configured to transmit a first image to a first display device, the device comprising:
  means for receiving a second image representative of a scene, the scene comprising a second display device displaying a third image;
  means for receiving the third image;

means for obtaining a first information representative of pose of the second display device with respect to the scene;

means for distorting the third image according to the first information;

means for generating the first image by combining the second image and the distorted third image using the obtained first information;

means for transmitting data representative of the first image.

The present disclosure also relates to a device for a device configured to transmit a first image to a first display device, the device comprising:

a receiver configured to receive a second image representative of a scene, the scene comprising a second display device displaying a third image and to receive the third image;

a processor configured to:
obtain a first information representative of pose of the second display device with respect to the scene;
distort the third image according to the first information;
generate the first image by combining the second image and the distorted third image using the first information;

a transmitter configured to transmit data representative of the first image.

The device is configured to perform the steps of the abovementioned method.

The present disclosure also relates to a computer program product comprising instructions of program code for executing, by at least one processor, the abovementioned method of transmitting a first image, when the program is executed on a computer.

The present disclosure also relates to a (non-transitory) processor readable medium having stored therein instructions for causing a processor to perform at least the abovementioned method of transmitting a first image.

4. LIST OF FIGURES

The present disclosure will be better understood, and other specific features and advantages will emerge upon reading the following description, the description making reference to the annexed drawings wherein.

5. DETAILED DESCRIPTION OF EMBODIMENTS

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details.

The present principles will be described in reference to a particular embodiment of a method of transmitting a first image to a first display device (e.g. a HMD or a tablet) and a device configured for implementing the method. The first image to be transmitted is composited by combining a second image (e.g. extracted from a video content into which a user is immersed) with a third image (e.g. an image representative of the real environment of the user who is watching the immersive content or an image of a message received by the user on his/her smartphone or tablet the user is holding in his/her hands). The third image is for example overlaid onto an image of a second display device the user is currently holding. An image of the hands of the user may be optionally added to the first image on the image of the second display device displaying the third image.

Adding a visual content (i.e. the third image) into a second image to form the first image enables a user immersed for example into an immersive content (i.e. the second image) to interact with his/her real environment. For example, when a user immersed in an immersive content (e.g. when wearing a HMD displaying the immersive content) receives a call or a SMS on his/her smartphone, he/she has the ability to have a direct view on the received call or SMS while being still immersed within the immersive content. The displaying of his/her smartphone he/she is holding in his/her hands with an image of his/her hands superposed on the image of the smartphone within the immersive content enables the user to control the smartphone as if he/she was seeing it in his/her real environment. The image of the call or of the SMS is for example received from the smartphone (e.g. via a controlling apparatus) to benefit from the full display resolution of the HMD.

According to another embodiment, the second image may correspond to an image of a scene comprising a second display device displaying the third image, e.g. a video content. The second image is for example acquired with an image acquisition device (e.g. a camera, a webcam) associated with the first display device, e.g. embedded into the first display device (e.g. the rear camera of a tablet or a smartphone, a camera integrated into the front face of a HMD to acquire images of the scene into which a user wearing the HMD moves). To benefit from an optimal resolution of the image of the scene displayed on the first display device, the third image may be received by an image processing device directly from the source device (e.g. a set-top box, a decoding device associated with the second display device) transmitting the third image to the second display device. The image processing device may composite the first image by combining the received third image (or a processed version of the same) and the second image.

Figure 1A:
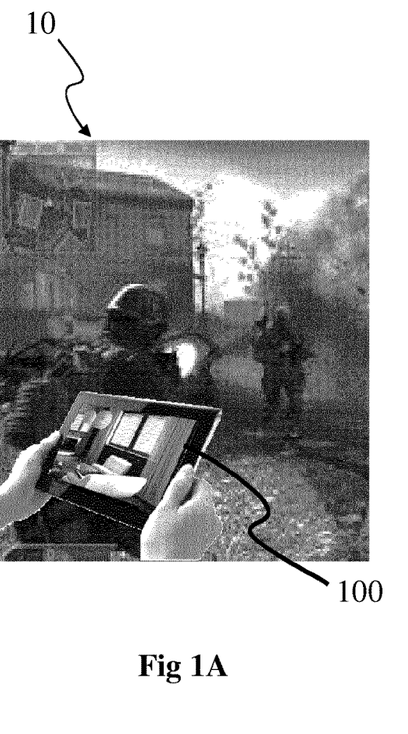
FIGS. 1A and 1B each show an example of a first image obtained from a second image and a third image illustrated on FIGS. 1C and 1D respectively, in accordance with an example of the present principles.
Figure 1B:
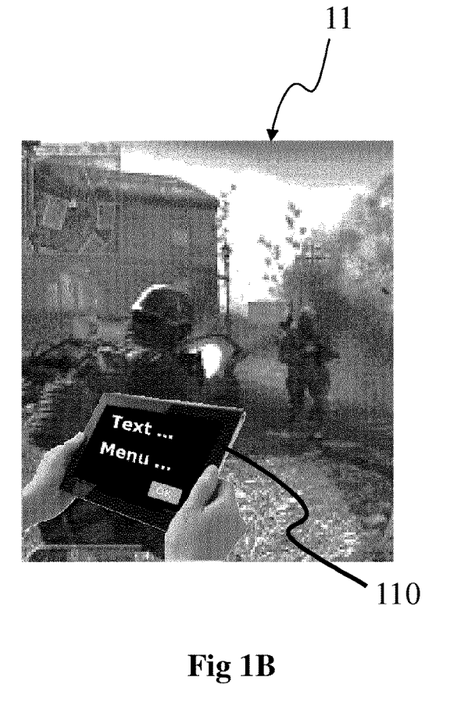

FIGS. 1A and 1B shows two examples of a first image 10, 11 to be displayed on a first display device, e.g. a HMD, according to a particular and non-limiting embodiment of the present principles. The first image 10, 11 is for example a still image or an image of a first video sequence composed of a sequence of first images. The first image 10, 11 is for example obtained from two or three different sources. The first image 10, 11 may be obtained by combining a second image 12 illustrated on FIG. 1C with for example a part of a fourth image 13 illustrated on FIG. 1D, for example the part of the fourth image 13 representing a second display device 130, e.g. a mobile device such as a tablet or a smartphone, hold by hands of a person, e.g. the person wearing or holding the first display device.

Figure 1C:
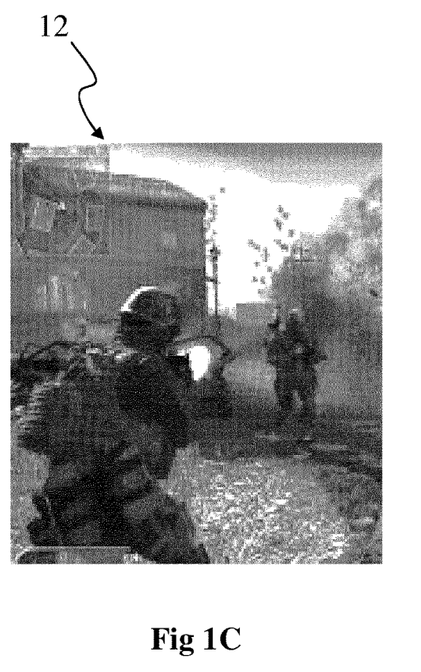

FIG. 1A illustrates a first example of a first image 10, obtained from the combining of the second image 12, with the part of the image 13 comprising the second display device 130, a third image 100 being overlaid onto the image of the second display device 130 extracted from the fourth image 13. In this non-limiting example, the third image 100 corresponds to an image of the real environment acquired by the camera of the second display device 130 illustrated in the fourth image 13. One or more fiducial markers are displayed on the second display device 130 in the example of FIG. 1D, the fiducial markers being used to locate and/or segment the second display device 130 as explained with more details with regard to FIG. 2. A fiducial marker comprises for example a two-dimensional black-and-white pattern composed of geometrically simple shapes such as squares or rectangles. The fourth image 13 corresponds for example to an image of the real environment into which the user wearing the first display device stands, the user holding the second display device 130. The fourth image 13 may be acquired with a camera of the first display device acquiring images of the real environment of the user wearing the first display device, the main direction of the acquisition corresponding for example to the main visualization direction of the user wearing the first display device, the acquisition direction varying with the movement of the head of the user wearing the first display device. According to another example, the fourth image 13 may be acquired with a camera external to the first display device, for example a webcam or a camera of a video surveillance system. The second image 12 corresponds for example to a computer-generated image (CGI), i.e. an image representative of a virtual environment, a CGI superimposed on an image associated with a real-world view (called augmented reality or mixed reality) or a an image associated with a real-world view. The encrusting of images of the real environment of the user within the second image 12, by using an image of the second display support as support for the overlaying of the third image, enables the user to have a view of his/her real environment while staying immersed in the environment (real or virtual) of the second image. If the third image is provided by a camera of the second display device, the user may choose what he/she wants to see by pointing the second display device toward the area of the real environment he/she wants to see (e.g. when a person enters in the environment of the user and starts talking to him/her). The third image acquired by the camera of the second display device is transmitted to a controlling device (e.g. the apparatus 5 described with regard to FIG. 5), which transmits the distorted third image to the first display device. The distorted third image benefits from the resolution of the camera of the second display device and from the resolution of the screen(s) of the first display device. According to a variant, the third image 100 is overlaid directly onto the second image 12 without using the image of the second display device 130 as support for the third image.

Figure 1D:
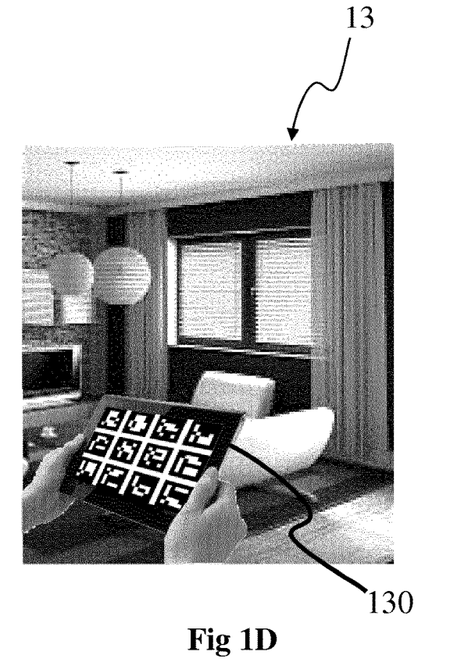

FIG. 1B illustrates a second example of a first image 11, obtained from the combining of the second image 12, with the part of the image 13 comprising the second display device 130, a third image 110 being overlaid onto the image of the second display device 130 extracted from the fourth image 13. In this non-limiting example, the third image 110 corresponding to an image of a Graphical User Interface (GUI) comprising one or more graphical objects (for example menu, buttons). A user immersed within the first image 11 has the ability to press any graphical object as if he was seeing physically the GUI displayed on the second display device he/she is currently holding in his/her hands, while still having the impression of being immersed into the environment of the second image 12. Any action on a graphical object of the GUI is transmitted to a controlling device (e.g. the apparatus 5 described with regard to FIG. 5), which may redirect the control parameter associated with the pressed graphical object to the intended apparatus, for example the first display device when the GUI aims at controlling one or more parameters associated with the first image (e.g. the brightness, the intensity of the audio track associated with the first image, the contrast, the play/pause) or to other elements of the real environment when the GUI aims at interacting with or controlling the real environment of the user (e.g. controlling lightings elements, shutters, audio players). According to a variant, the third image 110 is overlaid directly onto the second image 12 without using the image of the second display device 130 as support for the third image.

The second image 12 corresponds to an image obtained for example from a second video sequence of second images. The second video sequence corresponds for example to an immersive video content. An immersive video content corresponds to a video enabling a user watching it to browse into the video, i.e. only a part of the immersive content being displayed on the screen(s) of the first display device at a determined time, the displayed part depending from the viewing direction of the user wearing the first display device. An immersive video content corresponds to a sequence of one or more images having each a field of view greater than the field of view of the first display device used to visualize the immersive content. An immersive video comprises an image or a sequence of images, each image correspond for example to a computer-generated images (CGI), a CGI superimposed on a real-world view (called augmented reality or mixed reality) or a real-world view acquired for example with multiple cameras to obtain for example a 180°, 220° or 360° image of the real world (also called 4π steradians video). Such a video content is called immersive video content as it enables the user watching it to feel immersed into the video content, the user being able to browse into the video content. The browsing into the immersive video content is rendered possible by display devices such as HMD.

Figure 6:
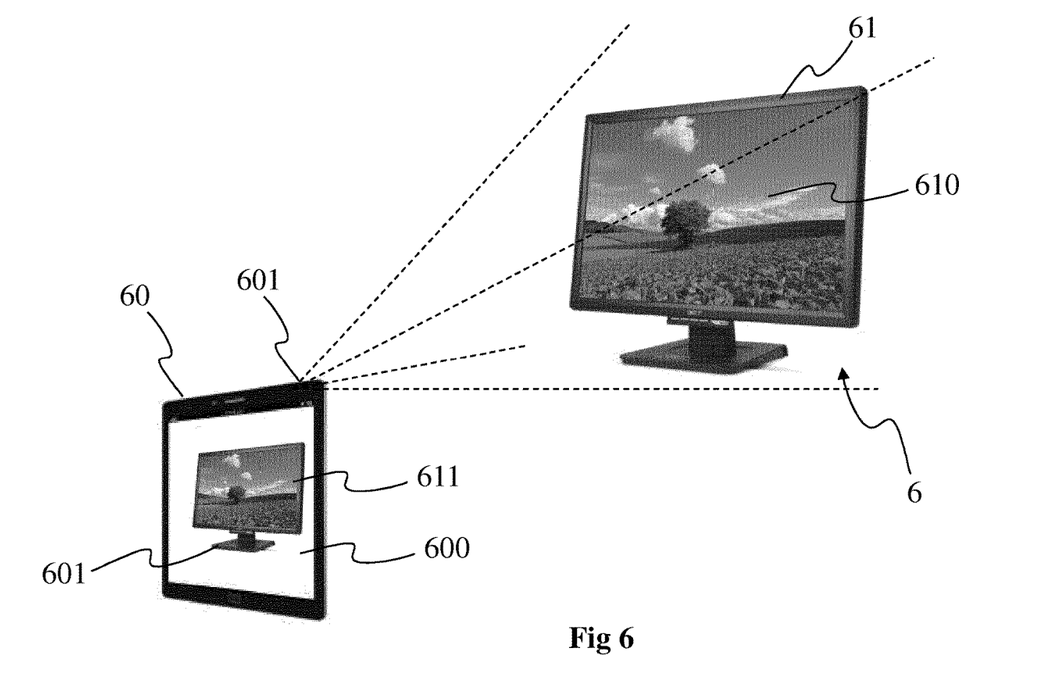
FIG. 6 shows another example of a first image obtained from a second image and third image, in accordance with an example of the present principles.

FIG. 6 shows a further example of a first image 600 displayed on a first display device 60, e.g. a tablet, according to a further particular and non-limiting example of the present principles. The first image may be a still image or an image of a first video sequence comprising a sequence of first images. The first image 600 is for example obtained by combining a plurality of images, e.g. 2, 3 or more, obtained from different sources. The first image 600 corresponds for example to the combining of a second image and a third image. When the first image is an image of a first video sequence, the first video sequence may be obtained by combining a second video sequence comprising a sequence of second video images and a third video sequence comprising a sequence of third video images, each first image corresponding to the combining of one second image of the second video sequence with one third image of the third video sequence having a same associated timestamp within the second and third video sequences respectively.

The second image is for example obtained by acquiring a scene 6, for example with the rear camera 601 of the first display device 60. The view of the scene 6 contained in the second image depends for example from the field of view (or the focal) of the camera 601 represented with dashed lines. The second image is for example a large field-of-view image (up to 360°, e.g. 110°, 135°, 180°, 240° or 360°) or a standard field-of-view image (e.g., 65°, 70° or 90°). The scene 6 comprises one or more second display devices 61 (e.g. a television set and/or a display screen associated with a projector and/or a smartphone and/or a tablet) and optionally one or more other objects (not illustrated on FIG. 6) that may depend from the nature of the scene (e.g. a sofa when the scene corresponds to a living room, a bed when the scene corresponds to a bedroom, a table when the scene corresponds to a dining room, seats when the scene corresponds to a cinema). According to a variant, the second image of the scene 6 is acquired with a camera that is not embedded in the first display device 60, e.g. a webcam or a security camera.

The first image 600 comprises as a part of it a representation 601 of the second display device 61 of the scene.

The third image 611 corresponds to the content 610 displayed on the second display device 61 while acquiring the second image. To obtain the first image 600, the first image is created by augmenting the second image using the third image 611. Augmentation may be for example obtained by overlaying the third image 611 onto the second image, for example on the area of the second image corresponding to the representation of the second display device 61. Other augmentations are possible, for example partial overlaying of the second image by the third image in not occluded areas when an object (not shown) occludes parts of the display device 61 in the second image. Other augmentation modes may include creating super-resolution images, overlaying zoomed parts of the third image, adding color management—linked to scene light and properties of the first and second display—to the third image before augmentation. The content 610 of the third image is for example received by an image processing apparatus configured to process the second image and received third image 610 to obtain the second image. The third image 610 is for example received from a source device transmitting the third image 610 to the second display device 61, e.g. a storage device, a decoding device, a set-top-box, a DVD or Blue-Ray reader, a laptop, a personal computing device, a mobile device such as a tablet or a smartphone. Using the third image that is received directly from the source enables to increase the display quality of the third image. Display quality comprises resolution, blurring, noise and color aspects. The third image obtained from the source device has a better quality than the acquired version of the third image acquired with the camera 601 and available within the second image. Indeed, the second image suffers from the noise of the camera, limited spatial resolution of the camera sensor, limited temporal resolution of the camera electronics, camera sensor metamerism as well as other limited color capacities of the camera 601 and/or the display 60.

Figure 4:
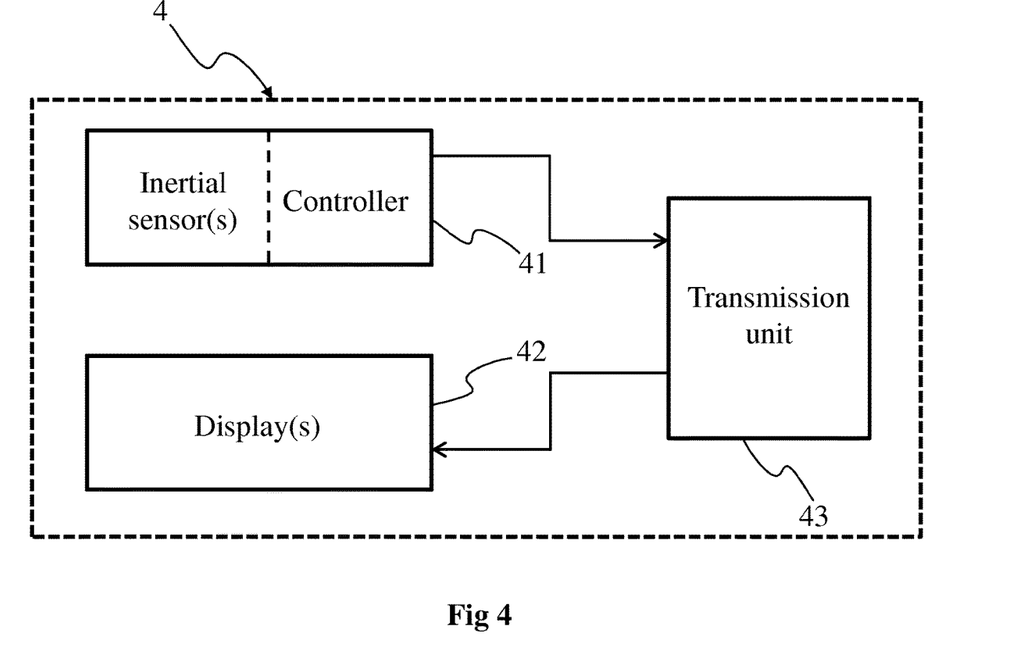
FIG. 4 diagrammatically shows the structure of a first display device 4 configured for displaying one or more first images of FIGS. 1A and 1B, in accordance with an example of the present principles.

FIG. 4 diagrammatically shows a hardware embodiment of a first display device 4 configured for displaying a video content, the content of which varying at least in part according to the position of the first display device 4. The first display device 4 corresponds for example to a HMD. The first display device 4 comprises at least one inertial sensor 41, at least one display unit (for example a LCD (Liquid Crystal Display), OLED (Organic Light-Emitting Diode) or LCOS (Liquid Crystal On Silicon)) 42 and a transmission unit 43. The inertial sensor 41 corresponds for example to a gyroscope and the first display device 4 comprises for example three gyroscopes, one for the pitch, one for the roll and one for yaw. According to another example, the inertial sensor 41 corresponds to an IMU (Inertial Measurement Unit). A controller may be associated with the inertial sensor, the controller being configured to process the data representative of change of position of the device acquired by the inertial sensor and to transmit this data to the transmission unit 43 via a first bus. The transmission unit 43 is for example a wireless interface and is configured to transmit the data received from the inertial sensor 41 to an external device (not shown) via a wireless link (for example according to Wi-Fi or Bluetooth). The external device is for example a Set-Top Box (STB), a computer or any device adapted to store and/or compose and/or decode video content(s). The transmission unit 43 may be further configured to receive data, via the wireless link, representative of the first image(s) 10 of the video content to be displayed on the display unit(s) 42, for example from the external device. The data representative of the first image(s) 10 to be displayed are then transmitted to the display unit(s) 42 via a second bus. According to a variant, the transmission unit is an interface configured to transmit/receive data via a wired link, for example according to USB or HDMI standard. The external device may transmit to the HMD the part of the video content corresponding to the measured position of the HMD. The part of the video content corresponding to the measured position of the HMD is for example determined with a specific function establishing the relationship between the point of view associated with the HMD in the real world and the point of view of a virtual camera associated with the video content. Controlling the parts of the video content to be displayed on the display screen(s) of the first display device according to the measured position of the first display device enables a user wearing the first display device to browse into the video content, especially when the video content is larger than the field of view associated with the display screen(s) of the first display device. For example, if the field of view offered by the first display device, i.e. a HMD, is equal to 110° (for example about the yaw axis) and if the video content offers a content of 180°, the user wearing the HMD may rotate his/her head to the right or to the left to see the parts of the video content outside the field of view offered by the HMD.

According to another example, the first display device 4 corresponds to a mobile device such as a tablet (e.g. the tablet 60 of FIG. 6) or a smartphone. The first image may be obtained by a processing device/unit (e.g. a CPU and/or GPUs) associated with a memory (e.g. RAM or SSD) embedded in the mobile device, the processing device/unit being configured to combine the second image and the third image to obtain the first image. According to this example, the transmission unit 43 is configured to receive the second image and/or the third image. The mobile device may also comprise an acquisition device, e.g. a camera, configured to acquire the second image.

Figure 2A:
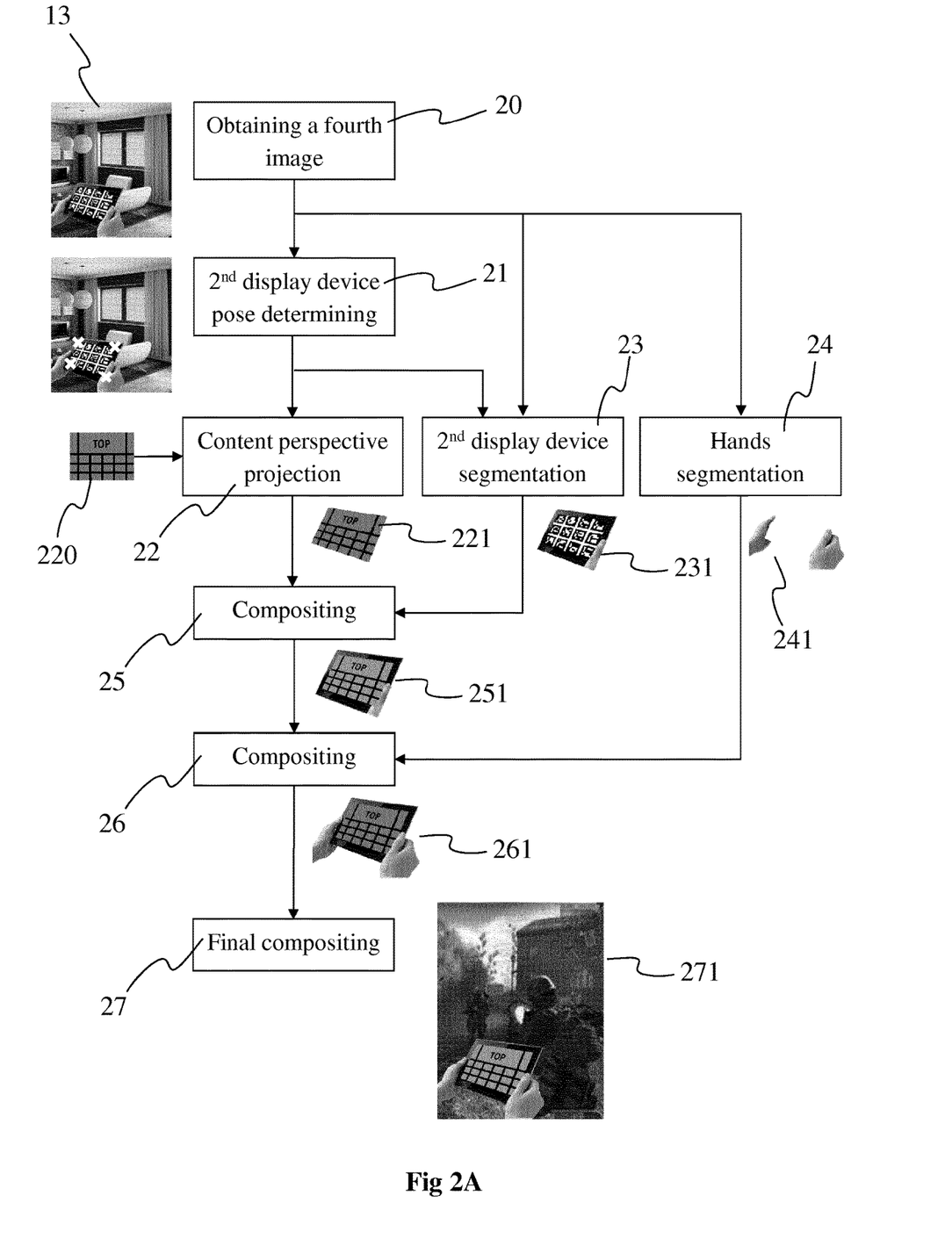
FIG. 2A shows a first process of obtaining a first image of FIG. 1A or 1B, in accordance with an exemplary embodiment of the present principles.

FIG. 2A shows a process adapted to generate a first image 10 or 11, according to a first particular and non-limiting embodiment of the present principles. The process is for example implemented by an image processing apparatus that is embedded or not in the first display device displaying the first image. An example of such an image processing apparatus is shown on FIG. 5.

In a first operation 20 of the process, a fourth image 13 is obtained. The fourth image 13 is for example received from an acquisition device such as a camera. The camera is for example associated with (for example integrated to) a first display device, e.g. a HMD, used to display the first image 10, 11 resulting from the process described with regard to FIG. 2. The camera may be a camera associated with the real environment in which stands the user wearing the HMD. According to another example, the fourth image is received from a storage device, for example a memory such as a RAM (Random Access Memory) or a SSD (Solid-State Drive) memory. The fourth image 13 is for example representative of a determined view of the real environment into which stands the user wearing the first display device, the view being determined by the acquisition direction of the camera used to acquire the fourth image. In the example of FIGS. 2 and 1D, the fourth image comprises a representation of a second display device, e.g. a mobile device such as a tablet or a mobile phone, hold by the hands of the user wearing the first display device.

In a second operation 21 of the process, the position of the second display device in the real environment is determined. The position is for example determined by detecting, in the fourth image, visible landmarks arranged on the second display device, for example on one or more corners of the second display device, a position determination method using visible landmarks being for example described by Fanelli et al. in "*Real time head pose estimation with random regression forests*", in *Computer Vision and Pattern Recognition*, 2011. According to another example, the position may be determined by analyzing the fourth image using nonlinear optimization algorithm or using a method minimizing an object-space collinearity error, as described by Chien-Ping Lu et al. in "*Fast and Globally Convergent Pose Estimation From Video Images*", Feb. 18, 1998. According to another example, one or more fiducial markers are displayed on the second display device and used when analyzing the fourth image to determine the pose of the second display device, as described for example by Fakhr-eddine Ababsa et al. in "Robust Camera Pose Estimation Using 2D Fiducials Tracking for Real-Time Augmented Reality Systems" in ACM SIGGRAPH VRCAI, 2004, pp. 2226-2229. An ArUco software in OpenCV, combined with a board of fiducial markers displayed on the second display device, may be used for example, providing three vectors representing the orientation of the marker board and the position of each marker in the fourth image.

According to a variant, the position information is transmitted by the second display device, parameters representative of the position being for example determined by sensors (e.g. gyroscopes) of the second display device.

According to another variant, the orientation may be used with the position information, for example when the position information is not sufficient. For example, when the second display device has a rectangular or square shape, determining the coordinates of the four corners provides a sufficient information with regard to the position of the second display device for performing the following operations. In contrast, when the coordinates of a single point of the second display device are determined, the position information may be completed with the orientation of the second display device in the 3D space. Position with orientation information form the pose information.

In a third operation 22, a third image 220 is projected to fit the position or the pose of the second display device determined at operation 21. The third image 220 is distorted to fit the perceived geometry of the second display device by applying perspective projection. To reach that aim, a homographic matrix to be applied to distort the fourth image to be overlaid onto the representation of the second display device in the fourth image is determined. The homographic matrix is for example determined by using the position or pose information determined in the operation 21 with the points of the third image corresponding to the corners of the fourth image, a mapping being established between the points of the third image corresponding to the corners of the fourth image and corresponding points of the representation of the second display device. The applying of the homographic matrix to the input third image 220 provides a distorted third image 221 having a shape corresponding to the shape of the representation of the second display device.

When the fourth image is acquired with a camera external to the first display device, a second information representative of the pose of the first display device (expressed in the same reference frame than the pose information of the second display device) is needed to distort the third image. This second information may be obtained in a same way as the first pose information of the second display device, i.e. for example by analyzing the image comprising the first display device and the second display device or may be obtained directly from sensors associated with the first display device.

In a fourth operation 23 and in a fifth operation 24 that may be performed sequentially or concurrently, the representation of the second display device 231 and of the hands 241 of the user in the fourth image 13 are segmented. Image segmentation is the process of partitioning an image into multiple segments, each segment corresponding to a set of pixels. The segmentation of the second display device is performed based on the information representative of the position, e.g. when the position information is given by the coordinates of the corners of the second display device. According to a variant, the segmentation is further based on information representative of the dimensions (e.g. length and width), for example when only the coordinates of only one corner of the second display device are known or when only the orientation information of the second display device is known. Said dimension information is for example received for the second display device or retrieved from a look-up table providing such an information for a list of different references of second display devices. The segmentation of the hands of the user is for example performed by detecting the skin tone in a HSV color space, as described by V. A. Oliveira et al. in "*Skin Detection using HSV color space*".

In a sixth, seventh and eighth operation 25, 26, 27, a final first image 221 is obtained with compositing operations that may be performed sequentially or concurrently. The compositing corresponds to the combining of visual elements from different sources into single image(s). The distorted third image 271 is overlaid onto the segmented representation 231 of the second display device and the segmented representation of the hands 241 is inserted into the first image to be seen in front of the segmented representation displaying the distorted third image. The final compositing 27 consists in encrusting or overlaying the representation of the hands with the distorted third image onto the second image to generate the final first image 271. This enables the user to have a window displaying a supplemental content within the content he/she is currently watching on the first display device. Depending on the content of the third image, it enables the user to have for example a view on the real environment into which he/she stands and/or to control one or more objects of the real environment into which he/she stands and/or to control the content he/she was currently watching.

Figure 2B:
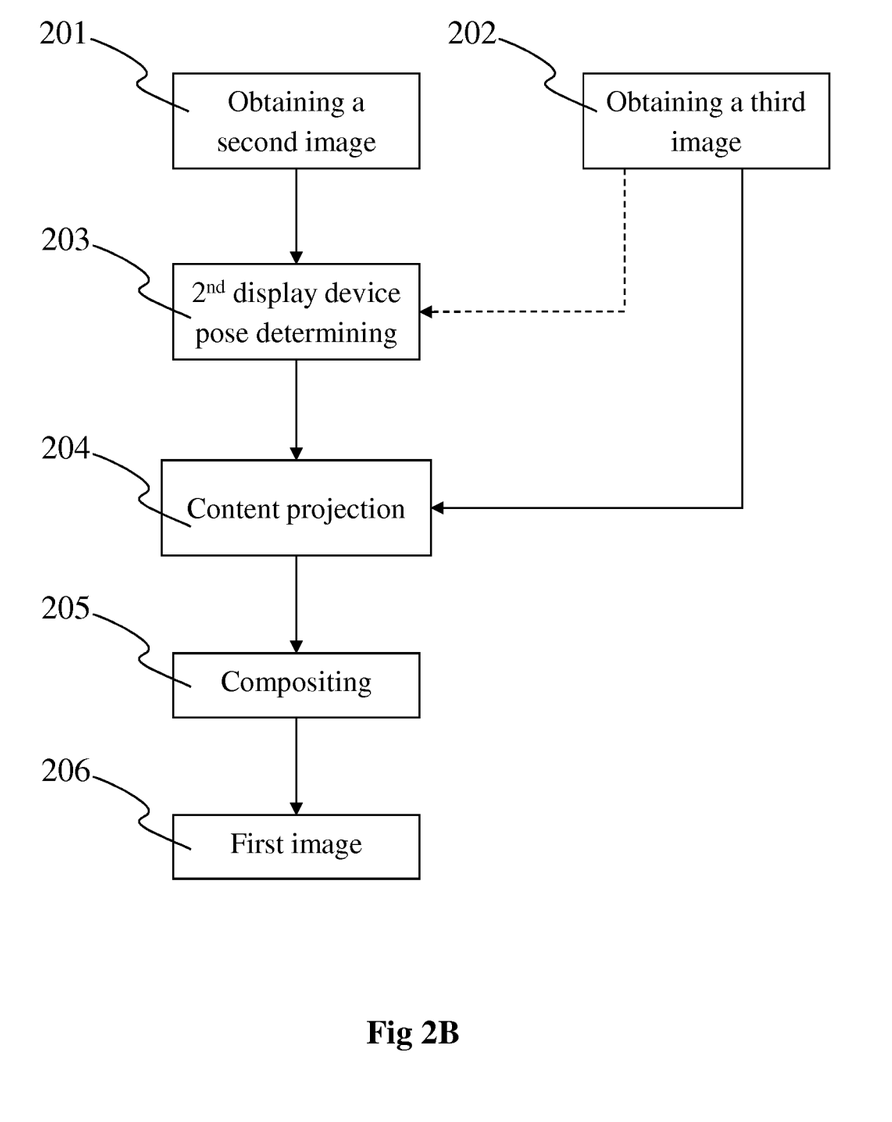
FIG. 2B shows a second process of obtaining a first image of FIG. 6, in accordance with an exemplary embodiment of the present principles.

FIG. 2B shows a further process adapted to generate a first image 600, according to a second particular and non-limiting embodiment of the present principles. The process is for example implemented by an image processing apparatus that is embedded or not in the first display device displaying the first image. An example of such an image processing apparatus is shown on FIG. 5.

In a first operation 201 of the process, one or more second images representative of a scene 6 is or are obtained. The second image is for example received from an acquisition device such as a camera. The camera is for example associated with (for example integrated to) a first display device, e.g. a HMD or a tablet, used to display the first image 600 resulting from the process described with regard to FIG. 7. The camera may be a camera associated with the real environment in which stands the user wearing the first display device. According to another example, the second image is received or obtained from a storage device, for example a memory such as a RAM (Random Access Memory) or a SSD (Solid-State Drive) memory. The second image is for example representative of a determined view of the real environment into which stands the user wearing the first display device, the view being determined by the acquisition direction of the camera used to acquire the second image. In the example of FIGS. 7 and 6, the second image comprises a representation of a second display device 61, e.g. a television set.

In a second operation 202 of the process, one or more third images 610 are obtained, for example received from a source device. The third images correspond for example to the images displayed on the second display device of the scene 6. The source device corresponds for example to the source device transmitting and/or decoding the third images for display on the second display device. The one or more third images may be stored in a memory (e.g. a RAM or SSD) of the image processing apparatus or in cache for further processing. The one or more third images are received via a wireless (e.g. WiFi or Bluetooth) or a wired (e.g. Ethernet or USB or HDMI) connection.

In a third operation 203 of the process, the position, orientation, scale and shape of the second display device 61 in the scene 6 with regard to the point of view and viewing direction of the second image (e.g. the acquisition point of view of the second image) is determined. To reach that aim, the representation of the second display device in the second image may be for example detected in the second image. The position is for example determined by detecting, in the second image, visible landmarks arranged on the second display device, for example on one or more corners of the second display device, a position determination method using visible landmarks being for example described by Fanelli et al. in "*Real time head pose estimation with random regression forests*", in *Computer Vision and Pattern Recognition*, 2011. Scale and orientation of the landmarks give scale and orientation of the second display. The shape of the second display may be obtained for example by analysing the shape of the area in the $2^{nd}$ image that is occupied by detected landmarks.

According to another example, the position, orientation and scale may be determined by analyzing the second image using nonlinear optimization algorithm or using a method minimizing an object-space collinearity error, as described by Chien-Ping Lu et al. in "*Fast and Globally Convergent Pose Estimation From Video Images*", Feb. 18, 1998.

According to another example, the position of the second display device is determined by comparing the content of the second image with the video content (i.e. the third image) displayed on the second display device in the scene 6, the video content (i.e. the third image) being received directly from the source transmitting the latter video content to the second display device. Knowing the content of the video (i.e. the third image) that is displayed on the second display device 6, the aim of the comparison process is to locate such video content in the second image, which enables to detect the position, orientation, scale and shape of the representation of the second display device within the second image. According to a further example, the position of the second display device is determined by comparing the content of different successive (temporally speaking) second images with each other. By considering that the point of view associated with a group of successive second images (e.g. 10, 20 or 20 frames of a video sequence corresponding to a sequence of second images) does not vary, the only part of the content of the second image that changes over time corresponds to the content that is displayed on the second display device 61. Second images may be registered with respect to one of them and the representation of the second display device may be detected by image differentiation that highlights the changes within the sequence of second images due to the displaying of the third images on the second display device, the content of the third images varying over time.

According to another example, one or more fiducial markers are displayed on the second display device and used when analyzing the fourth image to determine the pose of the second display device, as described for example by Fakhreddine Ababsa et al. in "Robust Camera Pose Estimation Using 2D Fiducials Tracking for Real-Time Augmented Reality Systems" in ACM SIGGRAPH VRCAI, 2004, pp. 2226-2229. An ArUco software in OpenCV, combined with a board of fiducial markers displayed on the second display device, may be used for example, providing three vectors representing the orientation of the marker board and the position of each marker in the fourth image.

According to a variant, the orientation may be used with the position information, for example when the position information is not sufficient. For example, when the second display device has a rectangular or square shape, determining the coordinates of the four corners provides a sufficient information with regard to the position of the second display device for performing the following operations. In contrast, when the coordinates of a single point of the second display device are determined, the position information may be completed with the orientation of the second display device in the 3D space. Position with orientation information form the pose information.

In a fourth operation 204, the one or more third images 610 are projected to fit the position or the pose of the second display device determined at operation 203. A third image 610 is distorted to fit the perceived geometry of the second display device by applying projection. The projection may be perspective, weak perspective, orthographic, or of any other appropriate type having for example sufficient geometric precision or sufficiently light implementation footprint. To reach that aim and according to a non-limiting example, a homographic matrix to be applied to distort the received third image 610 to be overlaid onto the representation of the second display device in the second image is determined. The homographic matrix is for example determined by using the position or pose information determined in the operation 203 with the points of the third image 610 corresponding to the corners of the received, rectangular third image 610, a mapping being established between the corners of the received the third image and corresponding points of the representation of the second display device (e.g. the corners of the frame of the second display device detected in the second image). The applying of the homographic matrix to the received third image 610 provides a distorted third image 611 having a shape corresponding to the shape of the representation of the second display device. When the second image is acquired with a camera external to the first display device, a second information representative of the pose of the first display device (expressed in the same reference frame than the pose information of the second display device) is needed to distort the received third image 610. This second information may be obtained in a same way as the first pose information of the second display device, i.e. for example by analyzing the image comprising the first display device and the second display device or may be obtained directly from sensors associated with the first display device.

In a fifth operation 205, a final first image 600 is obtained with compositing operations that may be performed sequentially or concurrently. The compositing corresponds to the combining or augmentation of visual elements from different sources into single image(s). The distorted third image 611 is for example overlaid onto the representation 601 of the second display device. This enables the user to benefit from an optimal resolution resulting from the resolution of the received third image 610 with the resolution of the screen of the first display device.

According to a variant, the distorted third image 611 is overlaid at a fixed location over the time within the second images. For example, in a sequence of successive second images, a first third image may be overlaid onto the area of the first second image of the sequence corresponding to the representation of the second display device and the other third images (of a sequence of third images) may then be overlaid at the same location within the other second images of the sequence, even if the location of the representation of the second display device varies over time within the sequence of second images. The location of the representation of the second display device may vary when the user holding the first display device and acquiring the second images moves within the scene. Fixing the overlaying of the third image(s) at a fixed location enables to avoid small shakes of the third images due for example to hand-shake of the user acquiring the second images.

According to an optional variant, virtual objects may be added to the first image during the compositing process, for example when generating a first image representative of an augmented reality scene or of an augmented virtuality scene.

Figure 3:
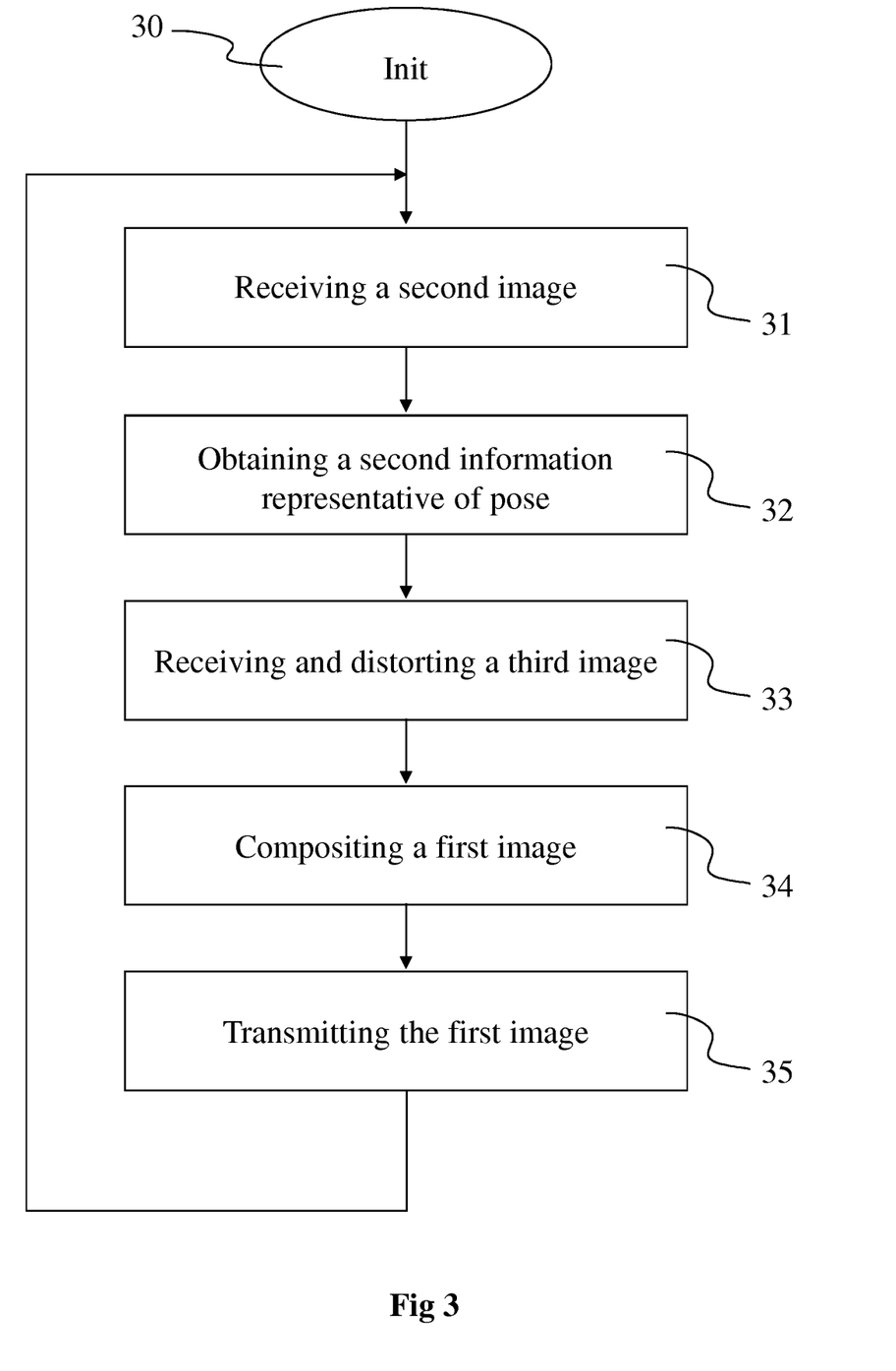
FIG. 3 shows a method of transmitting a first image of FIG. 1A or 1B to a display device, in accordance with an exemplary embodiment of the present principles.

FIG. 3 shows a method of transmitting a first image to the first display device, according to a particular and non-limiting embodiment of the present principles.

Figure 5:
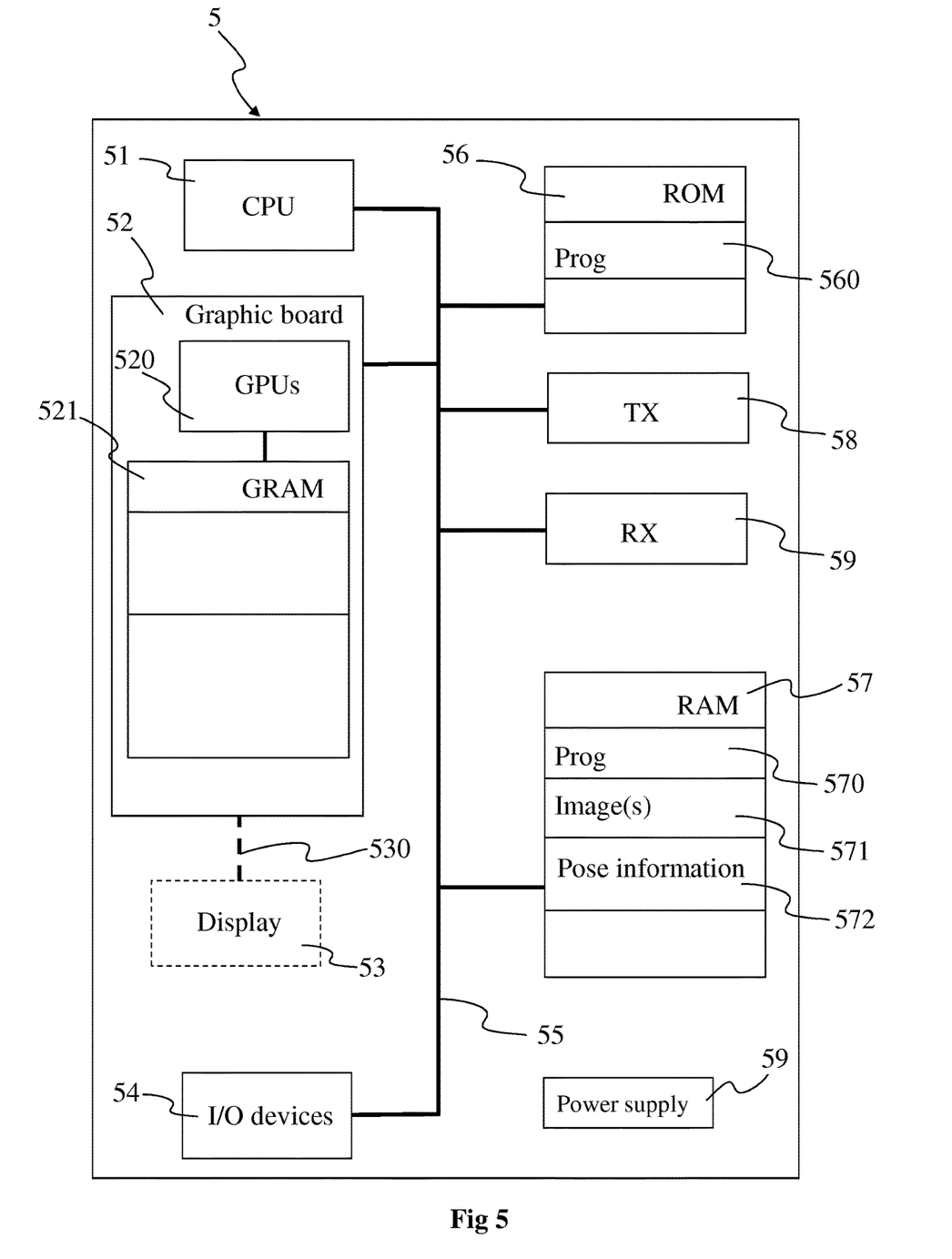
FIG. 5 diagrammatically shows the structure of an apparatus adapted to implement the method of transmitting the first image of FIGS. 3 and/or 7, in accordance with an example of the present principles.

In an initialisation step 30, the different parameters of the apparatus 5 are updated. In particular, the pose information, the parameters of the perspective projection are initialised in any way.

In a step 31, a second image is received. The second image is for example representative of a virtual environment, for example a computer-generated image (e.g. for gaming application). According to other examples, the second image is an image representative of a real environment, for example an image acquired with one or more cameras, or an image comprising real and virtual elements. The second image may belong to a sequence of consecutive second images (i.e. a video sequence). According to a specific embodiment, the second image is part of an immersive content, the dimensions of the second image corresponding to the size of the content that the first display device is able to display. The second image is for example received from a remote storage device (e.g. a server) via the Internet or over a wireless or wired connection in a LAN (Local Area Network). According to another example, the second image is received from a local memory (e.g. RAM or SSD) via a bus connecting the local memory from the processing unit (e.g. a processor, for example a CPU and/or one or more GPUs) configured to process the second image. According to another example, the one or more second images are received from an image acquisition device, e.g. a camera associated with the first display device.

In a step 32, a first information representative of position of a second display device is obtained, for example received or determined. The first information may for example be received from the second display device over a wired or wireless connection. According to another example, the first information is determined by applying a pose estimation algorithm on a fourth image comprising a representation of the second display device, as explained with more details in operation 21 of FIG. 2A or in operation 203 of FIG. 2B. The fourth image 220 (also called second image in the example of FIGS. 6 and 2B) may be acquired with a camera associated with the first display device or with a camera external to the first display device, for example belonging to the real environment into which the user wearing or holding the first display device stands. According to an optional variant, orientation information of the second display device may be obtained, position and orientation information combined together providing the pose of the second display device.

In a step 33, a third image is received. The third image is for example received from a remote storage device (e.g. a server) via the Internet or over a wireless or wired connection in a LAN (Local Area Network) or from a remote device (e.g. the second display device or a camera belonging for example to the real environment into which the user stands). The third image belongs to a group of images that comprises:

- an image of a video sequence, e.g. a movie or a video sequence representative of a real environment, for example the real environment in which the user wearing or holding the first display device stands. Said image is for example acquired with a camera associated with the second display device (which is for example hold by the user) or with a camera located within said real environment. According to a variant, the image is representative of a real environment remote from the environment of the user, for example representative of a room different from the room in which the user stands. According to another variant, the image is representative of a person, for example the face of a person, the image being for example acquired with the camera of a smartphone or of a tablet of said person and received on the second display device;
- an image of a video sequence representative of a virtual environment;
- an image of a video sequence representative of a scene combining real and virtual elements or objects;
- an image comprising one or more graphical objects of a Graphical User Interface (GUI) adapted for example to control parameters of the first and/or second images, to control elements of the environment of the user (for example the switching on/off of the light(s), the alarm, the shutters); and an image comprising textual elements, for example textual elements of a SMS (Short Message Service) received on the second display device.

The third image may be any of the abovementioned images of a combination of several or all of the abovementioned images, for example a sequence of third images comprising one or more images of the real environment, then one or more images of the face of a person calling the user on the second display device, then one or more textual elements. According to a variant, the third image may be a compositing of several of the abovementioned images, for example an image of the real environment of the user embedding graphical and/or textual elements.

The third image is then distorted according to the first position information (or according to the first pose information) obtained at step 32, as explained with more details with regard to operation 22 of FIG. 2.

In a step 34, a first image is generated (e.g. composited) by combining the distorted third image and the received second image. The distorted third image is for example overlaid onto a determined area of the received second image, e.g. in the bottom left part of the second image or in the bottom right part of the second image or in a part defined by the user. According to a variant, the compositing further comprises the combining of segmented parts of a fourth image comprising a representation of the second display device hold by the user wearing or holding the first display device. According to this variant, the third image is overlaid onto the segmented part representing the second display device with the hands of the user holding the second display device onto which is displayed the third image. The user wearing the first display device has then access to supplemental content, for example a view on his/her environment or a view to message incoming to the second display device (e.g. a smartphone or a tablet) without leaving the environment into which he/she is immersed. The overlaying of the third image received directly from the source enables to benefit from the full resolution of the first display device when displaying said third image.

In a step 35, data represented of the first image obtained at step 34 is transmitted to the first display device, for example to be displayed onto the screen(s) of the first display device. The data comprises for example texture information associated with the pixels of the first image, for example RGB information associated with each pixel.

The steps may be reiterated for several second images (i.e. a sequence of second images) and/or several third images (i.e. a sequence of third images) and/or several fourth images (i.e. a sequence of fourth images) to generate a sequence of first images.

FIG. 5 diagrammatically shows a hardware embodiment of an apparatus 5 configured for compositing and/or transmitting a first image. The device 5 is also configured for the creation of display signals of one or several first images. The device 5 corresponds for example to a tablet, a Smartphone, a games console, a computer, a laptop or a Set-top box.

The apparatus 5 comprises the following elements, connected to each other by a bus 55 of addresses and data that also transports a clock signal:

a microprocessor 51 (or CPU),
a graphics card 52 comprising:
  several Graphical Processor Units (or GPUs) 520,
  a Graphical Random Access Memory (GRAM) 521,
a non-volatile memory of ROM (Read Only Memory) type 56,
a Random Access Memory or RAM 57,
a transmitter 58 configured to transmit data representative of the first images, for example to the first display signal,
a receiver 59 configured to receive data from the second display device, from camera(s), from the first display device (e.g. information representative of a viewing direction), data representative of the second and/or third and/or fourth images, control parameters from the second display device;
one or several I/O (Input/Output) devices 54 such as for example a tactile interface, a mouse, a webcam, etc. and
a power source 59.

The apparatus 5 may also comprise one or more display devices 53 of display screen type directly connected to the graphics card 52 to display images calculated in the graphics card, for example live. The use of a dedicated bus to connect the display device 53 to the graphics card 52 offers the advantage of having much greater data transmission bitrates and thus reducing the latency time for the displaying of images composed by the graphics card. According to a variant, a display device is external to the apparatus 5 and is connected to the apparatus 5 by a cable or wirelessly for transmitting the display signals. The apparatus 5, for example the graphics card 52, comprises an interface for transmission or connection (not shown in FIG. 5) adapted to transmit a display signal to an external display means such as for example the first display device (e.g. an HMD), a LCD or plasma screen or a video-projector.

It is noted that the word "register" used in the description of memories 521, 56, and 57 designates in each of the memories mentioned, both a memory zone of low capacity (some binary data) as well as a memory zone of large capacity (enabling a whole program to be stored or all or part of the data representative of data calculated or to be displayed).

When switched-on, the microprocessor 51 loads and executes the instructions of the program contained in the RAM 57.

The random access memory 57 notably comprises:
in a register 570, the operating program of the microprocessor 51 responsible for switching on the apparatus 5,
data 571 representative of the first, second, third and/or fourth image(s) (for example RGB data),
information 572 representative of the position (and/or of the pose) of the second display device and/or of the first display device.

The algorithms implementing the steps of the method(s) specific to the present disclosure (e.g. the method of transmitting a first image and/or the method of compositing the first image) are stored in the memory GRAM 521 of the graphics card 52 associated with the apparatus 5 implementing these steps. When switched on and once the data 571 and the information 572 are loaded into the RAM 57, the graphic processors 520 of the graphics card 52 load these parameters into the GRAM 521 and execute the instructions of these algorithms in the form of microprograms of "shader" type using HLSL (High Level Shader Language) language or GLSL (OpenGL Shading Language) for example.

The random access memory GRAM 521 notably comprises:
in a register, data representative of the second images;
in a register, data representative of the third and/or fourth images;

in a register, data representative of the first image;

in a register, data representative of the position or pose information.

According to another variant, a part of the RAM 57 is assigned by the CPU 51 for storage of the identifiers and the distances if the memory storage space available in GRAM 521 is insufficient. This variant however causes greater latency time in the composition of an image comprising a representation of the environment composed from microprograms contained in the GPUs as the data must be transmitted from the graphics card to the random access memory 57 passing by the bus 55 for which the transmission capacities are generally inferior to those available in the graphics card for transmission of data from the GPUs to the GRAM and vice-versa.

According to another variant, the power supply 58 is external to the apparatus 5.

In an alternate embodiment, the apparatus 5 does not include any ROM but only RAM, the algorithms implementing the steps of the method specific to the present disclosure and described with regard to FIG. 2 or 3 being stored in the RAM. According to another variant, the apparatus 5 comprises a SSD (Solid-State Drive) memory instead of the ROM and/or the RAM.

Naturally, the present disclosure is not limited to the embodiments previously described.

In particular, the present disclosure is not limited to a method of transmitting a first image but also extends to a method (and a device configured for) compositing/generating the first image and/or to a method (and a device configured for) displaying the first image.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of transmitting a first image to a first display device, the method being implemented in a controlling device and comprising:

receiving, by the controlling device, a second image representative of a scene, the scene comprising a second display device displaying a third image;

receiving, by the controlling device, separate from the second image, a source content of the third image displayed on the second display device;

generating, by the controlling device, the first image by combining the second image with an overlay image generated from the source content of the third image according to information representative of a pose of the second display device with respect to the scene, wherein the overlay image comprises a representation of a screen of the second display device displaying the third image; and transmitting, by the controlling device, data representative of the first image to the first display device.

2. The method according to claim 1, wherein the second image is received from a camera associated with the first display device.

3. The method according to claim 1, wherein the source content of the third image is received from a source device transmitting the third image to the second display device for displaying on the second display device.

4. The method according to claim 1, wherein the information is obtained by comparing the source content of the third image with the content of the second image comprising the second display device displaying the third image.

5. The method according to claim 1, wherein the first display device is a head-mounted display and the second display device is a mobile device comprising a display screen.

6. The method according to claim 1, wherein the first display device is a mobile device comprising a display screen and the second display device is a screen of a television set.

7. The method according to claim 1, further comprising distorting the source content of the third image according to the information before generating the first image.

8. A device configured to transmit a first image to a first display device, the device comprising:
   a receiver configured to receive a second image representative of a scene, the scene comprising a second display device displaying a third image and to receive, separate from the second image, a source content of the third image;
   a processor configured to generate the first image by combining the second image with an overlay image generated from the source content of the third image according to information representative of pose of the second display device with respect to the scene, wherein the overlay image comprises a representation of a screen of the second display device displaying the third image; and
   a transmitter configured to transmit data representative of the first image.

9. The device according to claim 8, wherein the second image is received from a camera associated with the first display device.

10. The device according to claim 8, wherein the source content of the third image is received from a source device transmitting the third image to the second display device for displaying on the second display device.

11. The device according to claim 8, wherein the information is obtained by comparing the source content of the third image with the content of the second image comprising the second display device displaying the third image.

12. The device according to claim 8, wherein the first display device is a head-mounted display and the second display device is a mobile device comprising a display screen.

13. The device according to claim 8, wherein the first display device is a mobile device comprising a display screen and the second display device is a screen of a television set.

14. The device according to claim 8, wherein the processor is further configured to distort the source content of the third image according to the information before generating the first image.

* * * * *